(12) United States Patent
Vizcargüenaga Vizcargüenaga et al.

(10) Patent No.: US 10,473,158 B2
(45) Date of Patent: Nov. 12, 2019

(54) INTEGRATED SYSTEM FOR PRECISION ACTUATION AND SUPPORT FOR LARGE MOBILE STRUCTURES

(71) Applicant: IDOM, S.A.U., Bilbao (ES)

(72) Inventors: Alberto Vizcargüenaga Vizcargüenaga, Bilbao (ES); Gaizka Murga Llano, Bilbao (ES); Armando Bilbao Arechabala, Bilbao (ES); Ramón Campo Delgado, Bilbao (ES)

(73) Assignee: IDOM, S.A.U., Bilbao (ES)

( * ) Notice: Subject to any disclaimer, the term of this patent is extended or adjusted under 35 U.S.C. 154(b) by 144 days.

(21) Appl. No.: 15/546,104

(22) PCT Filed: Jan. 29, 2015

(86) PCT No.: PCT/ES2015/070058
§ 371 (c)(1),
(2) Date: Jul. 25, 2017

(87) PCT Pub. No.: WO2016/120501
PCT Pub. Date: Aug. 4, 2016

(65) Prior Publication Data
US 2018/0017106 A1 Jan. 18, 2018

(51) Int. Cl.
*F16C 29/00* (2006.01)
*F16C 32/06* (2006.01)
(Continued)

(52) U.S. Cl.
CPC .......... *F16C 32/0629* (2013.01); *F16C 29/02* (2013.01); *F16C 32/06* (2013.01);
(Continued)

(58) Field of Classification Search
CPC ........ F16C 29/02; F16C 29/025; F16C 32/06; F16C 32/0629; F16C 32/0633;
(Continued)

(56) References Cited

U.S. PATENT DOCUMENTS 5,822,116 A * 10/1998 Leblanc ................. G02B 7/183
359/430
6,196,515 B1 3/2001 Enterline
(Continued)

FOREIGN PATENT DOCUMENTS

CN 102436054 5/2012

*Primary Examiner* — Phillip A Johnson
(74) *Attorney, Agent, or Firm* — Aslan Law, P.C.

(57) ABSTRACT

An integrated system for precision actuation and support for large mobile structures, such as large telescopes, wherein an actuation is integrated on the basis of linear motors located in each of the frames that support the mobile structure on another fixed structure, the support of said frames on the fixed structure being carried out by means of hydrostatic feet. The connection between this frame and the driving structure is made via a flexible kinematic connection that permits relative movements between both (frame and structure), such that the mechanism is only affected in its operation through the small-scale deformations of the track via which it circulates, and not through the large-scale deformations of the structure.

20 Claims, 4 Drawing Sheets

(51) Int. Cl.
 *F16C 29/02* (2006.01)
 *G02B 7/183* (2006.01)
 *G02B 7/198* (2006.01)
 *G02B 23/16* (2006.01)

(52) U.S. Cl.
 CPC ............ *G02B 7/183* (2013.01); *G02B 7/198* (2013.01); *G02B 23/16* (2013.01)

(58) Field of Classification Search
 CPC ....... F16C 2370/20; G02B 7/18; G02B 7/183; G02B 7/198; G02B 23/16
 See application file for complete search history.

(56) References Cited

U.S. PATENT DOCUMENTS

| | | | |
|---|---|---|---|
| 6,278,561 B1* | 8/2001 | Teske | G02B 23/16 359/430 |
| 2007/0076310 A1* | 4/2007 | Sakino | G02B 7/183 359/819 |
| 2010/0329593 A1 | 12/2010 | Tomelleri | |
| 2010/0329594 A1 | 12/2010 | Tomelleri | |
| 2017/0030407 A1* | 2/2017 | Hermansson | F16C 32/0677 |

* cited by examiner

INTEGRATED SYSTEM FOR PRECISION ACTUATION AND SUPPORT FOR LARGE MOBILE STRUCTURES

OBJECT OF THE INVENTION

The invention relates to a precision support system for structures such as large telescopes, large machine tools, etc., wherein an actuation is integrated on the basis of linear motors located in a single frame, which is supported by means of a hydrostatic-type system, which guarantees the correct positioning of the stator/rotor of the motor, maintaining the air gap at a very low and constant level.

This system is designed to support and move structures similar to the European Extremely Large Telescope (E-ELT), which will have a 39-meter-diameter primary mirror and will be the largest telescope in the world.

BACKGROUND OF THE INVENTION

Traditionally applied solutions on smaller telescopes (ones with mirror diameters from 8-10 m) consisted of directly fastening hydrostatic feet and linear motors to the node joints of the structure, which made them susceptible to misalignments due to deformations in the structure. These problems have generally been solved by providing the feet with a ball joint. This solution, which already caused problems with the Large Binocular Telescope (LBT), is unviable in the case of new Extremely Large Telescopes with a diameter between 20 and 50 m, due to the fact that it is necessary to find a way to make the large deformations of the structure compatible with the necessary precisions of the mechanism.

In these cases, a system of hydrostatic supports is used, the function of which consists of supporting a rigid and stable structure, placing an oil film between the hydrostatic supports and the surface of the guide on which they slide, in order to allow for the movement thereof with minimal force and to prevent wear.

In patent literature we find documents such as patent US2010329593, in which hydrostatic supports for large structures are described, especially suitable for large telescopes.

Also forming part of the state of the arte are linear motors, which are electric motors in which the stator and rotor are distributed such that instead of producing rotational movement they produce a force in a longitudinal direction. Low acceleration linear motors are appropriate for surface transport and in patent literature there are several examples thereof.

DESCRIPTION OF THE INVENTION

The new E-ELT optical infrared telescope will allow us to globally advance our knowledge in the field of astronomy. It is a design that consists of a primary mirror with a diameter of 42 m. The main mirror, as well as the other four mirrors which complete the optical train and many other different systems have been mounted on the Main Structure of the Telescope, which is a large mobile structure 60 m high and 70 m wide, with a total weight of approximately 3000 tons, which enables the telescope to aim at a celestial body and follow it, compensating for the movement of the rotation of the Earth.

The main structure of the telescope is made up of two substructures with relative movement between the azimuth structure and the altitude structure. The mechanisms of the telescope (azimuth and altitude) support said structures by actuating relative movement.

The invention relates to a precision support wherein an actuation is integrated on the basis of linear motors located in each one of the frames supporting the mobile structure, which is supported by means of a hydrostatic-type system guaranteeing the correct positioning of the stator/rotor of the motor and maintaining the air gap at a very low and constant level. The hydrostatic feet, which operate with a 60-70 micron layer of typical oil, adapt to the track, ensuring the correct positioning of the linear motors which need an air gap of approximately one millimeter.

These frames which integrate the linear motors and the hydrostatic feet precisely adjust to the track on which they circulate, guaranteeing the correct operation of the systems, while the connection of each one of the frames to the driving structure is made by a kinematically compatible (flexible) connection which allows for relative movements between both (frame and structure). This way the mechanism is only affected in its operation by the small-scale deformations of the track via which same circulates, and not by the large-scale deformations of the structure.

The support and precision actuation system integrates three devices which are essential to the operation thereof:
a) An actuating device which consists of a rail located on a fixed structure, the outer surface of which constitutes the stator of an electric linear motor, the rotor of which is located in each of the frames which support the mobile structure, located in correspondence with the stator in order to maintain the air gap at a very low and constant value (less than 1 mm).
b) A support device comprising at least one track located on a plane parallel to that which defines the surface of the previously mentioned rail, on which a series of hydrostatic feet slide which are present on the support face of each one of the frames which support the mobile structure, guaranteeing a correct and very close positioning of the stator/rotor of the actuating linear motor.
c) A connecting device between each one of the frames and the driving structure, through a kinematically flexible connection which allows relative movements between both (frame and structure), acting vertically and rigidly, but behaving as a ball joint by establishing a flexible connection at moments which enable relative rotation without the appearance of secondary moments.

This system is complemented with a brake unit also existing on each frame which is supported by the fixed structure and which support the mobile structure. All of these brake units are mounted on a disc which is located on a plane parallel to the tracks on which the hydrostatic feet and the rail are supported which, in conjunction with the frames, forms the electric linear motor.

DESCRIPTION OF THE FIGURES

As a complement to the description provided herein, and for the purpose of helping to make the characteristics of the invention more readily understandable, the present specification is accompanied by a set of drawings constituting an integral part of the same, which, by way of illustration and not limitation, represent the following.

PREFERRED EMBODIMENT OF THE INVENTION

Figure 1:
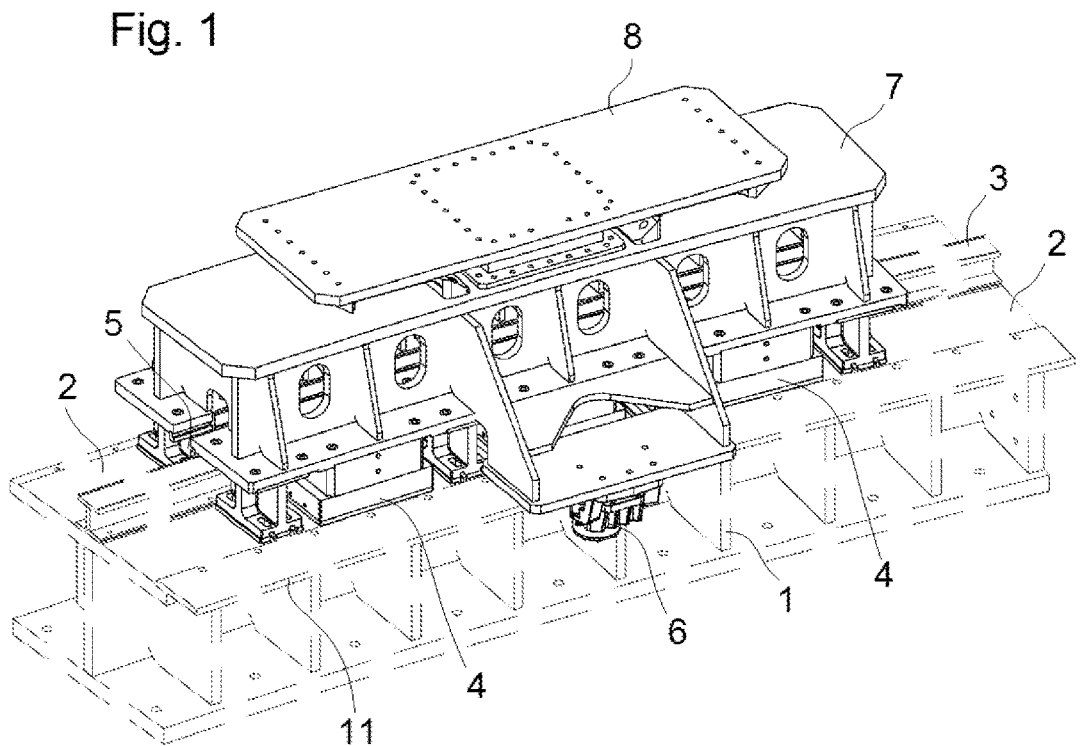
FIG. 1 shows a perspective view of a possible implementation of the system.
Figure 2:
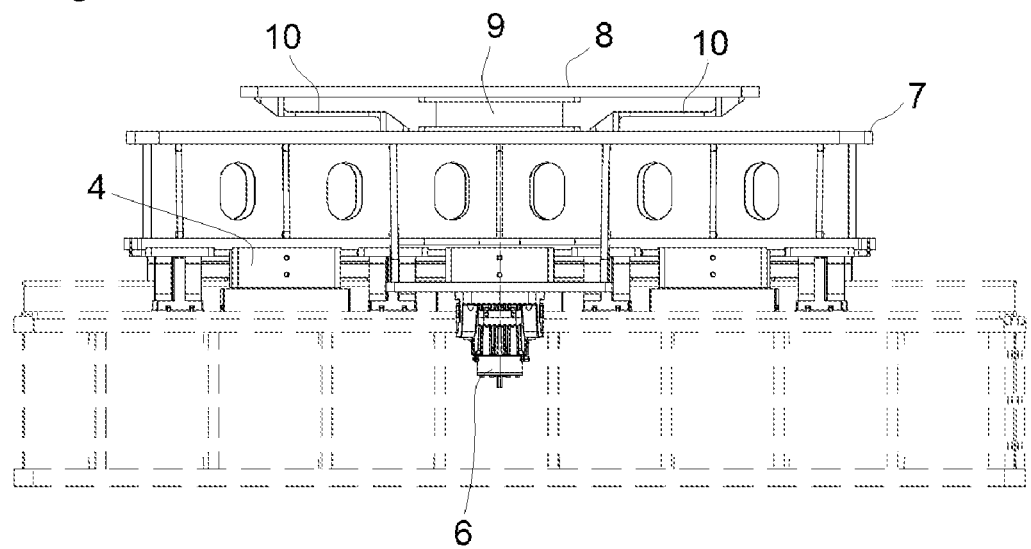
FIGS. 2 and 3 show a side elevation and a plan view from below, respectively, of the support and actuating system of the invention.
Figure 3:
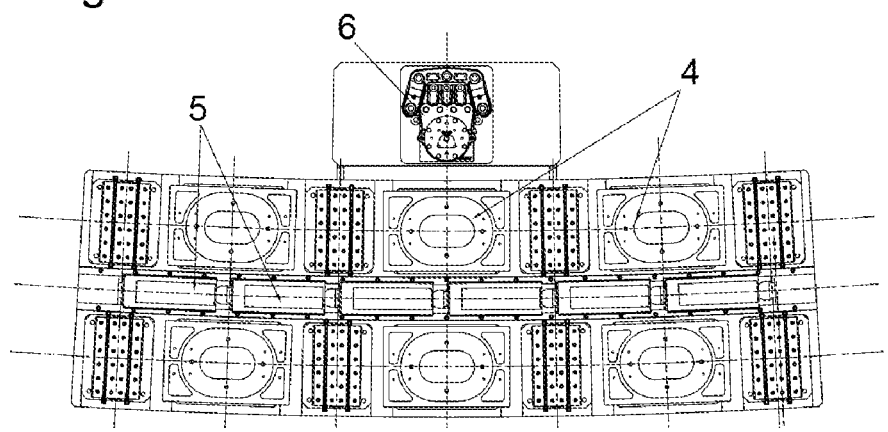
Figure 4:
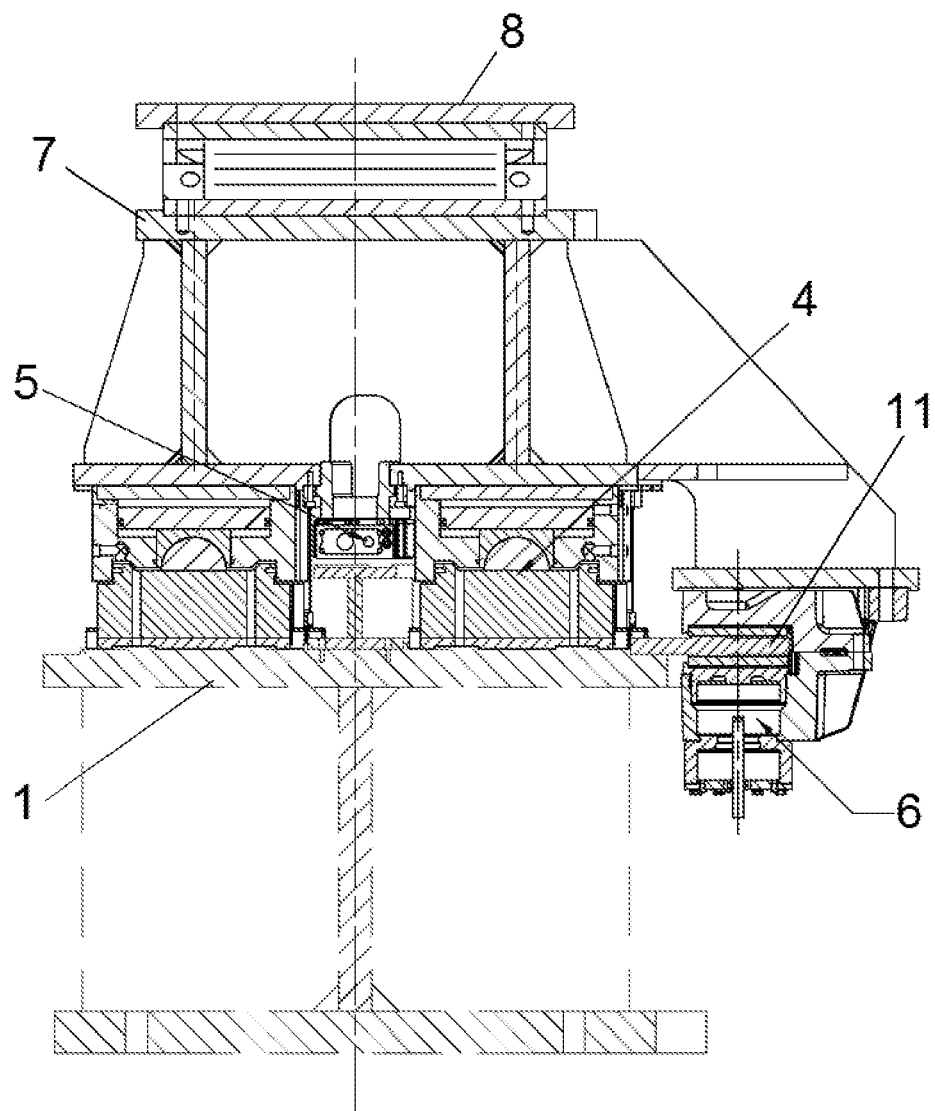
FIG. 4 shows a cross-sectional view according to a transverse plane of the system.
Figure 5:
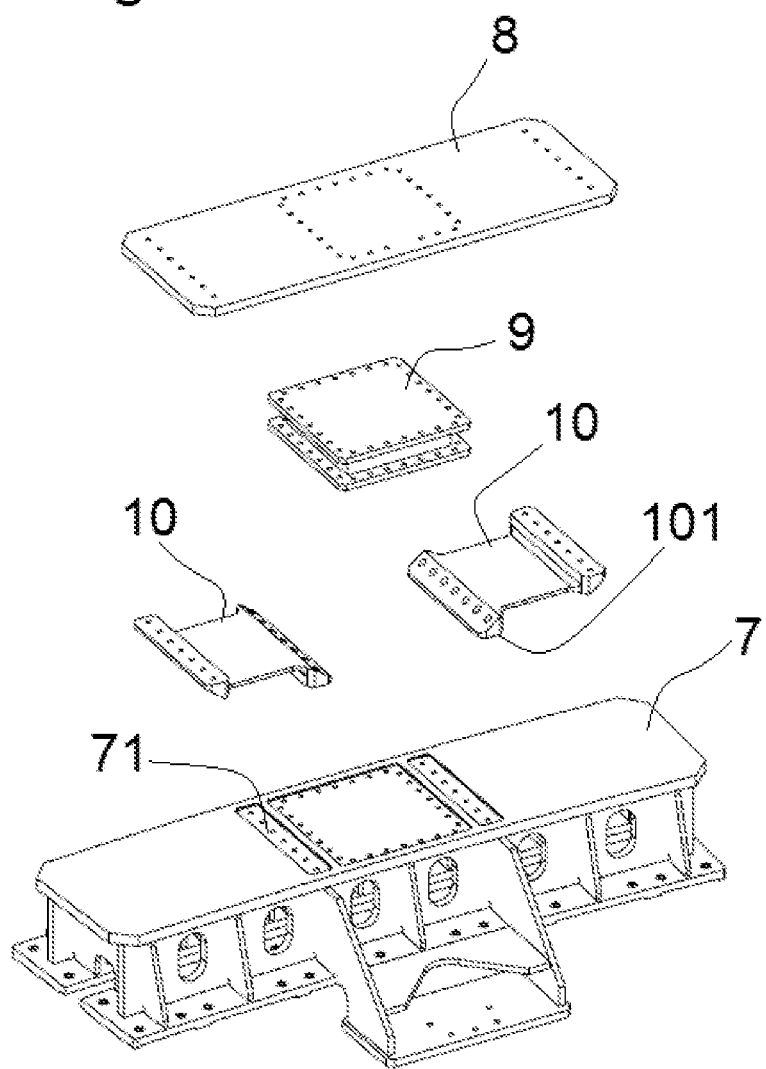
FIG. 5 shows a deployment view of the connection between the structure and the frame.

As shown in the figures, the system for precision actuation and support for large mobiles structures is based on the existence of a fixed support structure (1) in which the mobile structure is secured by a series of frames (7) placed at different points, normally uniformly distributed.

The fixed structure (1) has a central rail (3) which is guarded by lateral tracks (2) which has, on the outer surface thereof, preferably on both sides, the constitution and configuration of the stator of an electric linear motor (5), the rotor of which is located in a frame (7) and located in correspondence with the same, maintaining the air gap at a low and constant value. The fixed structure (1) has tracks (2) located on a plane parallel to that which defines the surface of the rail (3) on which a series of hydrostatic feet (4) present on the support face of the frame (7) slide, guaranteeing a correct and very close positioning of the stator/rotor of the actuating linear motor (5).

In turn, each of the frames (7) in which the mobile structure is supported by the fixed structure (1) comprises:

The rotor of an electric linear motor (5) arranged longitudinally, in correspondence with the rail (3) present on the fixed support structure (1).

A series of hydrostatic feet (4) arranged along the face by which said frame (7) is supported by the track (2) of the fixed structure (1); which operate with a 60-70-micron layer of typical oil, thereby guaranteeing an approximation between the stator and the rotor of the linear motor which define an air gap less than 1 mm.

Each frame (7) defines a connection mechanism in the driving mobile structure, via a flexible kinematic connection that permits relative movements between both (frame and structure), such that the mechanism is only affected in its operation through the small-scale deformations of the track via which same circulates, and not through the large-scale deformations of the structure. This mechanism comprises rigid connections (10) which open in opposite directions toward the directions of the movements of the mobile structure, supporting thereon a rigid plate (8), parallel to and above the frame (7), while between both elements (frame (7) and plate (8)) an elastomer (9) is placed, which occupies the central area of the connection means and is suitable for making a rigid connection in a vertical direction, but flexible at moments which enable relative rotation, without the appearance of secondary moments, which compensates for possible errors in the track.

The fixed support structure (1) has a disc (11) on a plane parallel to the tracks (2) and the rail (3) on which the hydraulic brakes (6) act, incorporated by each of the frames (7).

The invention claimed is:

1. An integrated system for precision actuation and support for a mobile structure, said mobile structure which slides over and is supported by a fixed support structure through a series of frames which secure the mobile structure to said fixed support structure, wherein the fixed support structure comprises:

a rail guarded by at least one lateral track, the outer surface of the rail constitutes a stator of an electric linear motor, and a rotor of which is located in a frame, maintaining an air gap at a low and constant value;

at least one track, located on a plane parallel to that which defines the surface of the rail on which a series of hydrostatic feet present on the support face of a frame slide, which provides a positioning of the stator and the rotor of the electric linear motor, wherein while, in turn, each of the frames in which the mobile structure is supported by the fixed support structure comprises:

the rotor of the electric linear motor, arranged longitudinally, in correspondence with the rail present on the fixed support structure;

said series of hydrostatic feet arranged along the support face by which said frame is supported by the at least one lateral track of the fixed support structure; and a connection device and/or section between said frame and the mobile structure that permits relative movements between both said frame and said fixed support structure, via a kinematically compatible flexible connection.

2. The system, according to claim 1, further comprising:

two tracks on which the series of hydrostatic feet fixed to the frame are supported, and said two tracks are located parallel and on each side of the rail which defines the stator of the electric linear motor.

3. The system according to claim 2, wherein the connection device and/or section between the frame and the mobile structure comprise rigid connections which open in opposite directions towards the directions of movement of the mobile structure, supporting thereon a rigid plate, parallel to and above the frame, while between said frame and said rigid plate, an elastomer is placed, which occupies the central area of the connection device and/or section, which is suitable for making a rigid connection in a vertical direction, but flexible at moments which enable relative rotation.

4. The system according to claim 3, wherein the fixed support structure has a disc on a plane parallel to the two tracks and the rail on which hydraulic brakes act, mounted on the frame.

5. The system according to claim 3, wherein the series of hydrostatic feet operate with a 60-70-micron layer of typical oil.

6. The system according to claim 3, wherein the air gap between the rail which forms the stator of the electric linear motor and the rotor fixed in the frame, is less than 1 mm.

7. The system according to claim 2, wherein the fixed support structure has a disc on a plane parallel to the two tracks and the rail on which hydraulic brakes act, mounted on the frame.

8. The system according to claim 2, wherein the series of hydrostatic feet operate with a 60-70-micron layer of typical oil.

9. The system according to claim 2, wherein the air gap between the rail which forms the stator of the electric linear motor and the rotor fixed in the frame, is less than 1 mm.

10. The system according to claim 1, wherein the connection device and/or section between the frame and the mobile structure comprise rigid connections which open in opposite directions towards the directions of movement of the mobile structure, supporting thereon a rigid plate, parallel to and above the frame, while between said frame and said rigid plate, an elastomer is placed, which occupies the central area of the connection device and/or section, which is suitable for making a rigid connection in a vertical direction, but flexible at moments which enable relative rotation.

11. The system according to claim 10, wherein the fixed support structure has a disc on a plane parallel to the two tracks and the rail on which hydraulic brakes act, mounted on the frame.

12. The system according to claim 10, wherein the series of hydrostatic feet operate with a 60-70-micron layer of typical oil.

13. The system according to claim 10, wherein the air gap between the rail which forms the stator of the electric linear motor and the rotor fixed in the frame, is less than 1 mm.

14. The system according to claim 1, wherein the fixed support structure has a disc on a plane parallel to the two tracks and the rail on which hydraulic brakes act, mounted on the frame.

15. The system according to claim 14, wherein the series of hydrostatic feet operate with a 60-70-micron layer of typical oil.

16. The system according to claim 14, wherein the air gap between the rail which forms the stator of the electric linear motor and the rotor fixed in the frame, is less than 1 mm.

17. The system according to claim 1, wherein the series of hydrostatic feet operate with a 60-70-micron layer of typical oil.

18. The system according to claim 17, wherein the air gap between the rail which forms the stator of the electric linear motor and the rotor fixed in the frame, is less than 1 mm.

19. The system according to claim 1, wherein the air gap between the rail which forms the stator of the electric linear motor and the rotor fixed in the frame, is less than 1 mm.

20. A fixed support structure comprises:
a rail;
at least one lateral track, wherein
the rail guarded by at least one lateral track and maintaining an air gap at a low and constant value,
said at least one lateral track located on a plane parallel to that which defines the surface of the rail on which a series of hydrostatic feet present on the support face of a frame slide,
said at least one lateral track provides a positioning of a stator and a rotor of an electric linear motor,
the outer surface of the rail constitutes the stator of the electric linear motor and the rotor of which is located in a frame,
the rotor of the electric linear motor, arranged longitudinally, in correspondence with the rail present on the fixed support structure,
said series of hydrostatic feet are arranged along the support face by which said frame is supported by the at least one lateral track of the fixed support structure; and
a connection device and/or section located between said frame and the mobile structure that permits relative movements between both said frame and said fixed support structure, via a kinematically compatible flexible connection.

* * * * *